United States Patent [19]

Guter et al.

[11] 4,189,235

[45] Feb. 19, 1980

[54] TEST DEVICE FOR DYNAMICALLY MEASURING THE DEGREE OF DIRT ACCUMULATION ON BANK-NOTES

[75] Inventors: Norbert Guter; Josef Gier, both of Munich; Herbert Bernardi, Arget; Erhard Lehle, Muelheim, all of Fed. Rep. of Germany

[73] Assignee: G.A.O.Gesellschaft für Automation und Organisation mbH, Fed. Rep. of Germany

[21] Appl. No.: 855,734

[22] Filed: Nov. 29, 1977

[30] Foreign Application Priority Data

Nov. 29, 1976 [AT] Austria ................................ 8827/76

[51] Int. Cl.[2] ............................................ G01N 21/32

[52] U.S. Cl. .................................... 356/239; 209/534; 250/562; 250/572; 356/430

[58] Field of Search ............... 356/200, 237, 238, 239; 250/562, 572; 209/534; 356/430

[56] References Cited

U.S. PATENT DOCUMENTS

| | | | |
|---|---|---|---|
| 3,718,823 | 2/1973 | Niikura et al. | 209/534 X |
| 3,922,557 | 11/1975 | Carnes, Jr. | 209/534 X |

*Primary Examiner*—John K. Corbin

*Assistant Examiner*—Matthew W. Koren

*Attorney, Agent, or Firm*—McGlew and Tuttle

[57] ABSTRACT

A device for dynamically measuring the degree of dirt accumulation on bank-notes in which certain areas of the bank-note are illuminated and examined by means of a receiving unit. The light from a succession of adjacent elemental areas of a bank-note so illuminated is dependent upon the degree of dirt accumulation and is converted into a corresponding electric signal. The signal is analyzed to determine the number and amount of changes due to dirt accumulated in creases, and the analyzed signal is integrated to determine whether or not the number and nature of areas of accumulated dirt makes the ban-note unsuitable for further circulation.

20 Claims, 14 Drawing Figures

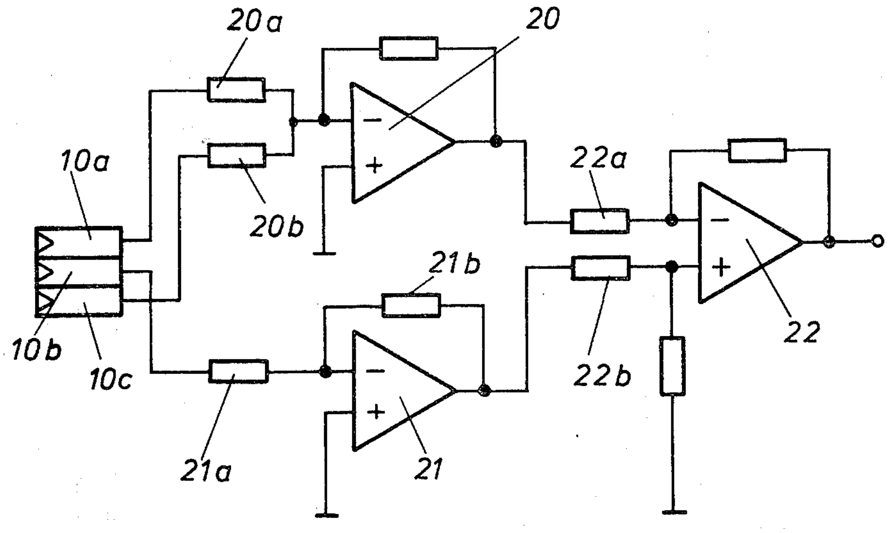
Fig. 3
Fig. 5
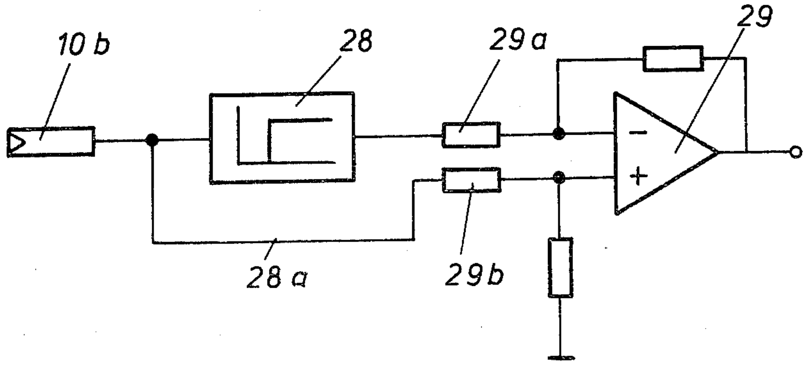

TEST DEVICE FOR DYNAMICALLY MEASURING THE DEGREE OF DIRT ACCUMULATION ON BANK-NOTES

BACKGROUND OF THE INVENTION

1. Field of the Invention

This invention relates to the field of optically examining sheets of paper, such as bank notes, that are not very transparent. In particular, it relates to a device for dynamically measuring the amount of dirt accumulated on a bank-note.

2. The Prior Art

In connection with the continuing tendency of employing automatic methods in the fields of financial services, efforts are also made to an increasing extent for finding reliable and automatically analizable criteria for detecting whether the bank-notes in circulation are up to the standards of usefulness.

One criterion for measuring the or unusefulness of a bank-note, for example, is the degree to which the bank-notes are soiled.

In relation to the foregoing, a device has already become known (German Published Patent Application (DT-OS) No. 2,156,077), corresponding to U.S. Pat. No. 3,718,823 in which the light directed through the edge of a bank-note, impinges upon a scanning sensor. In a comparator the output signal of the scanning sensor which is dependent upon the transparency and, consequently, upon the soiling or degree of dirt accumulation on the edge of the bank-note, is compared with a reference signal corresponding to a non-soiled edge of a bank-note. The output signal of the comparator is used for deciding on whether the banknote is to be regarded as soiled or not.

Of a disadvantage in this process is the fact that owing to the principle of measurement, not only the soiling, but also the transparency is considered in the measuring signal.

Investigations, however, have shown that unused and used, as well as a variety of new bank-notes all have different transparencies. Therefore, the more the transparency differs, the greater the range of tolerance of the comparison signal has to be chosen, which considerably reduces the accuracy of the measurement and, consequently, the reproducibility of the once achieved degree of sorting out. The same also applies to the relatively strongly varying average shading component of the paper used for manufacturing the bank-notes. Moreover, also the high investment involved in circuitry needed for producing and storing a reference signal bearing the scanning contents of a reference bank-note is considered as a disadvantage.

OBJECT AND SUMMARY OF THE INVENTION

Accordingly, it is the object of the invention to propose a test device with the aid of which the degree of soiling or dirt accumulation on a bank-note can be detected and evaluated by involving a low investment in technical means and independently of both the transparency and the brightness or average shading component of the paper.

According to the invention, this object is achieved in that there is provided a transmit-receive unit with the aid of which, by means of a transmit unit containing a light source, various areal units are continuously illuminated along a track extending parallel in relation to the longitudinal edge of the bank-note, and by means of a receive unit composed of one or more photodiodes, a signal in proportion to the soiling of the illuminated areas is produced, in that, moreover, there is provided a processing unit in which the photodiode signals are converted into signals whose curve corresponds to the contrast among the areal units, and in which, finally, there is connected an evaluating unit producing a go-no go-signal.

Measuring the contrast, to be described hereinafter, is based on the principle according to which, on a track extending in parallel with the longitudinal edge of the bank-note, the transparency of one or more areal units of the bank-note edging is compared with the transparency of other areal units of the same bank-note track with the aid of a sensor unit consisting of photodiodes. In so doing, a bank-note is moved in such a way through the test device that the focused light of a lamp, in passing through the bank-note and through a lens system, impinges upon a sensor unit.

The following will be at first based on the assumption that the track to be examined, extends along the unprinted edge of the bank-note. On principle, as will be explained hereinafter, this track may also extend into the central area of the bank-note, the most part of which is printed.

Measuring the contrast at the bank-note edging is now based on the dirt regions existing in the creases (folds, dogs ears), for detecting the degree of dirt accumulation or soiling. In one particular type of embodiment, there is used for this purpose a sensor unit consisting of three photodiodes arranged next to each other and adapted to the size of the creases with the aid of the aforementioned lens system. The output signals of the photodiodes are in such a way combined with one another as to form the difference between the sum of the signal values of the two outer photodiodes, and the double signal value of the photodiode in the centre. In the signal resulting therefrom there is only still evaluated the contrast of the areal units in relation to one another and, consequently, the partial degree of soiling of the areal units covered by the photodiodes.

A further type of embodiment according to the invention is characterized by the fact that the transparencies of each time two areal units of the bank-note edging lying next to each other in the direction of movement of the bank-note, are compared with one another. In this way there is formed the difference between the output signal of only one diode and the time-delayed signal of the same photodiode. In so doing, the time-delayed signal is in proportion to the transparency of one areal unit which, in terms of time, follows another areal unit with a selectable delay.

The signals resulting in the two types of embodiment are fed via an integrator, to a comparator which, owing to the special signals which have been explained hereinbefore, is capable of deciding within narrow tolerances, on whether or not the bank-note is in a condition of being used.

In the following the invention will now be explained in greater detail with reference to the accompanying drawings, with exclusively the transmission method being used in the examples of embodiment for measuring the extent to which a bank-note is soiled. On principle, however, the measurement may also be carried out by employing the reflectance method.

BRIEF DESCRIPTION OF THE DRAWINGS

FIG. 3 shows a circuit arrangement for processing the photodiode signals when three photodiodes are used.

FIG. 5 shows a circuit arrangement for processing the photodiode signal when one photodiode is used.

FIGS. 7*a* and 7*b* show the signal waveforms relating to the circuit arrangement of FIG. 6.

DETAILED DESCRIPTION OF THE PREFERRED EMBODIMENT

Figure 1:
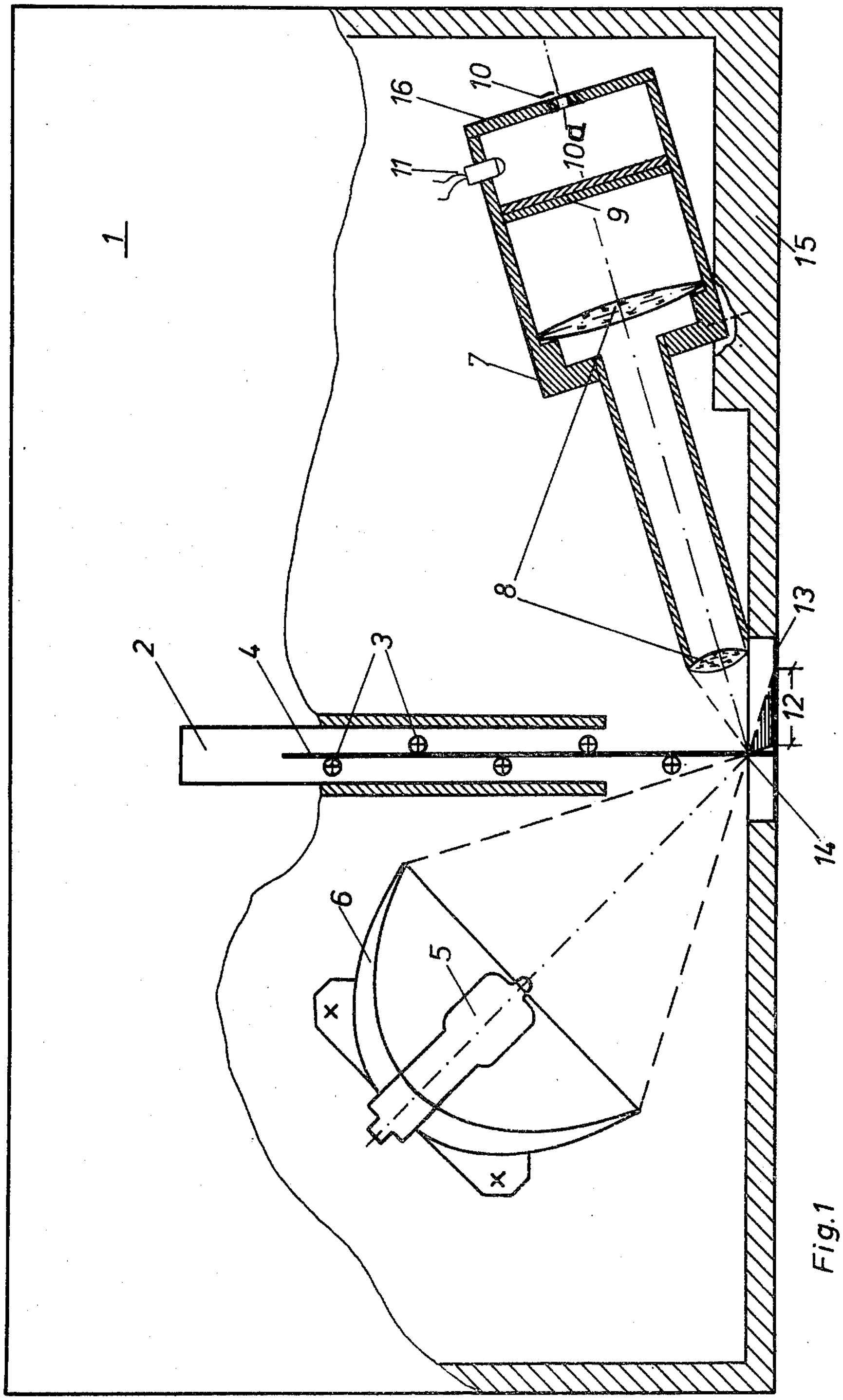
FIG. 1 is a view of the optical test device.

FIG. 1 shows a test device which is accommodated in a housing 1 and consists of a light source 5 with an ellipsoid mirror 6, a system for transporting the bank-notes 4, and a receiving system 7. The housing is closed and is merely provided with a narrow input or output slot 2 serving for insertion and removal of the bank-notes 4, respectively. The ellipsiod mirror 6 serves to concentrate—as is indicated by the dashlined path of rays of the light source—the radiation of the light source 5 upon the centre of the lower edge 14 of the bank-note 4, which, in the transport system, is passed through the test device with the aid of staggered transporting belts 3.

The receiving system 7 (hereinafter referred to as the receive unit 7) is firmly mounted to the baseplate 15 on the side lying opposite the light source 5. On principle, it is designed as a microscope which, through its lens system 8, projects the scanning elements (picture points) of the lower edge 14 of the bank-note 4, on an enlarged scale on to a sensor unit 10 positioned at a rear cover plate 16. The sensor unit, as is evident from FIG. 2, consists of three photodiodes 10*a*, 10*b*, 10*c* which are arranged directly next to each other. In FIG. 1, the individual photodiodes are shown to be arranged behind each other vertically in relation to the drawing plane. A filter combination 9 arranged between the lens system 8 and the sensor unit 10, serves to filter out of the impinging radiation the spectral components of the light which are most favourable for judging the degree of dirt accumulation.

A light-emitting diode 11 which is mounted in the rear portion of the receive unit 7 in the proximity of the sensor unit 10, serves to continuously control the test device.

As is recognizable from FIG. 1, both the light source 5 and the receive unit 7 are sloped at a certain angle in relation to one another and in relation to the vertical line on to the plane of the bank-note. In this way the receive unit 7 is prevented from being subjected to the direct radiation of light in the absence of a bank-note. Direct radiation would drive the circuit, which is still to be explained hereinafter, and by which the signals of the photodiodes 10*a*, 10*b*, 10*c* are evaluated, into the state of saturation during the intervals between two processes of testing two bank-notes, and would thus considerably slow down the evaluating speed. Therefore, in the absence of a bank-note, the light source 5 radiates a cone of light rays 12 indicated by the shaded portion (FIG. 1),,on to a blackened plate 13, so that little radiation is reflected on to the receive unit.

As already mentioned, a contrast measurement is carried out in the above-mentioned test device, in the course of which the dirt that has accumulated in the creases of the bank-note, is judged in relation to the unsoiled portions of the bank-note.

Figure 2:
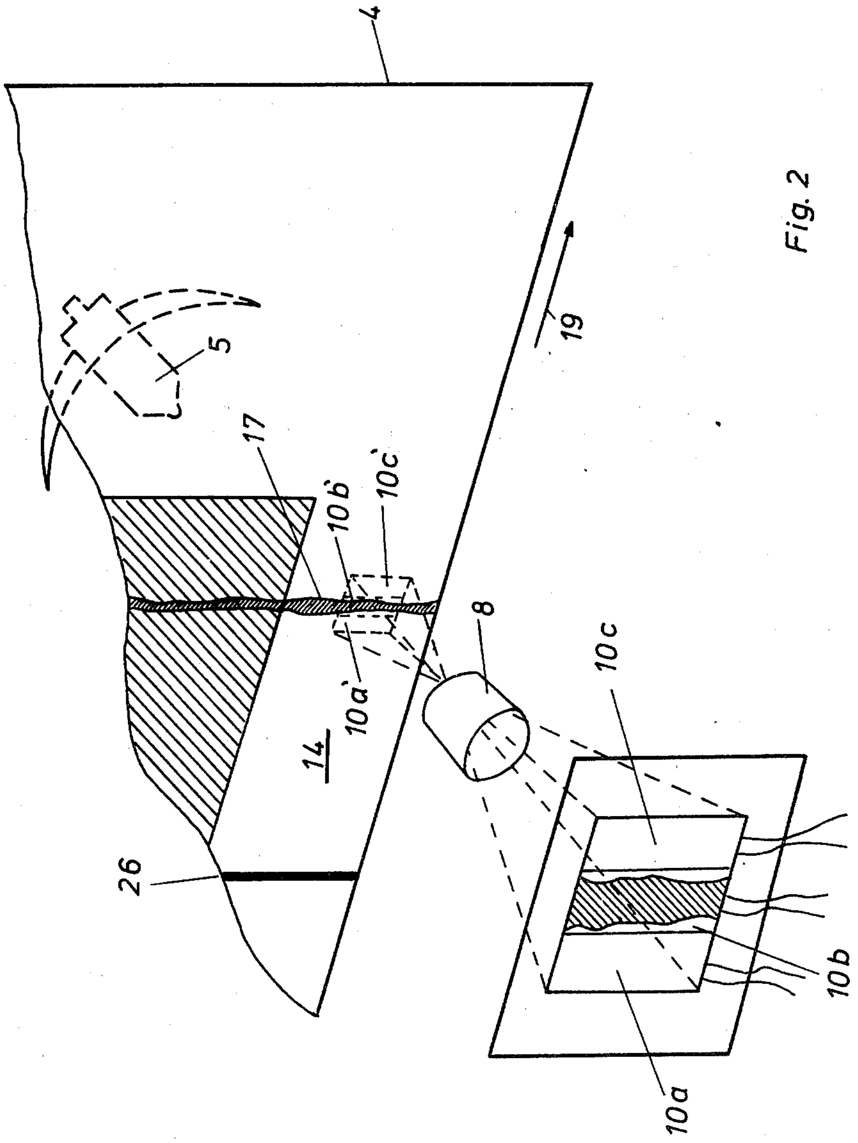
FIG. 2 is a schematical representation for explaining the mode of operation of the test device.

FIG. 2 shows part of the bank-note 4 to be tested, and in which a soiled crease 17 is shown on an exaggerated scale. As is evident from FIG. 2, such a crease 17, especially at the bank-note edging 14, distinguishes very well from its surrounding. The schematically shown lens system 8 is so designed that the effective size of the sensor unit 10 consisting of the three photodiodes 10*a*, 10*b*, 10*c*, is transformed relative to the bank-note edging 14 so that the individual photodiode image areas 10*a*', 10*b*', 10*c*', indicated by dashlines in FIG. 2, have almost the same width as a soiled crease 17. A safety thread incorporated in the bank-note 4 is indicated by the reference numeral 26.

When the bank-note edging is now moved in the direction indicated by the arrow 19, the lower bank-note edging will be swept step-by-step past the photodiode image areas 10*a*', 10*b*', 10*c*'. In the course of this, the individual photodiodes receive light from the light source 5 via the lens system and, in accordance with the received amount of light, produce an electric signal. Before the light shining through the edging impinges upon the sensor unit, it passes, as already mentioned, through a filter conbination not shown in FIG. 2, and which, for example, only transmits those spectral components of the light which are chiefly within the blue range of the spectrum.

FIG. 2 shows the momentary situation in which just the centre one of the three photodiodes 10*b* is almost completely covered by the image of a soiled crease 17 and, accordingly, receives a substantially smaller amount of light than the neighbouring photodiodes 10*a*, 10*c* and, consequently, also produces a substantially smaller output signal. When putting the photodiode signals derived from soiled areas of a bank-note in relation to one another as will be shown hereinafter, there will be obtained a signal which is clearly distinguishable from that of an unsoiled unit of area.

In the following the further processing of the photodiode signals will now be explained in greater detail with reference to FIGS. 3 to 5.

FIG. 3 shows one possibility by which the output signals of the three photodiodes 10*a*, 10*b*, 10*c* are combined in such a way with one another that the difference between the sum of the signals of the two extreme photodiodes 10*a* and 10*c* and the double signal value of the photodiode 10*b* in the centre is formed. In the course of this, the signals of the two extreme photodiodes 10*a*, 10*c* are fed across resistors 20*a*, 20*b* to one of the two inputs of a summing stage 20. The resistors 21*a*, 21*b* of an amplifier stage 21 are chosen so that the signal of the photodiode 10*b* in the centre, as applied to this amplifier stage, is doubled. The outputs of both the summing and the amplifier stage 20 and 21 are thereupon applied by way of resistors 22*a* and 22*b* to the two inputs of a subtracting stage 22.

In the following, and with reference to FIGS. 4a to 4d, there will now be explained the signal waveforms as resulting from the passage of a bank-note 4 through the test device.

Figure 4A:
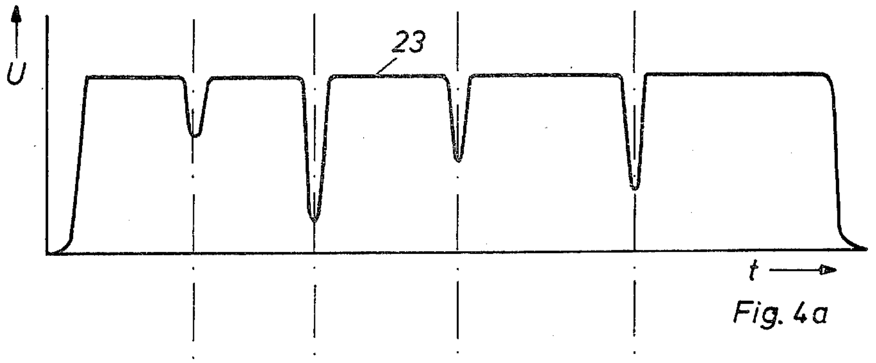
FIGS. 4*a* to 4*c* show the signal waveforms resulting from the circuit arrangement shown in FIG. 3.
Figure 4B:
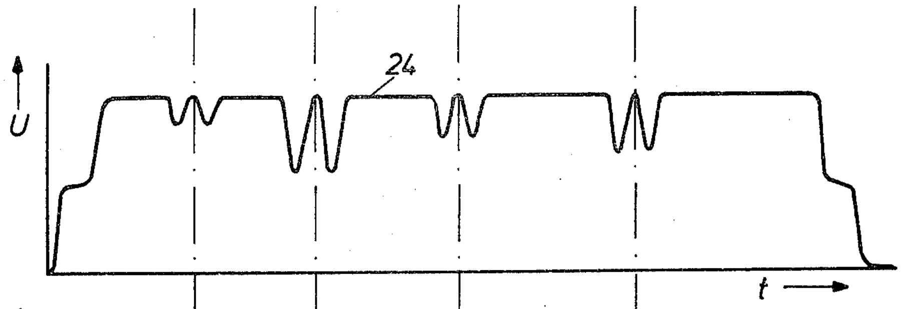
Figure 4C:
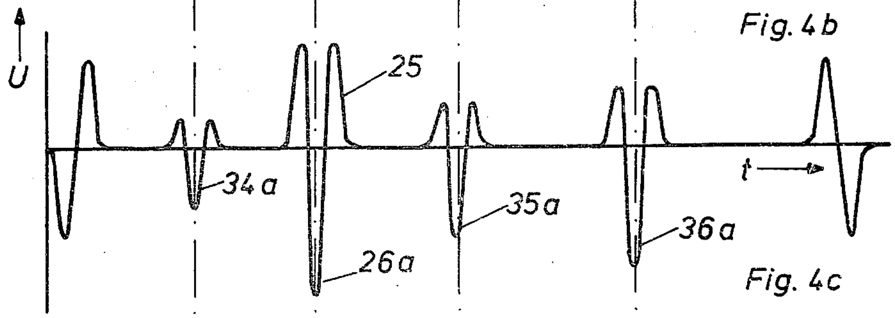
Figure 4D:
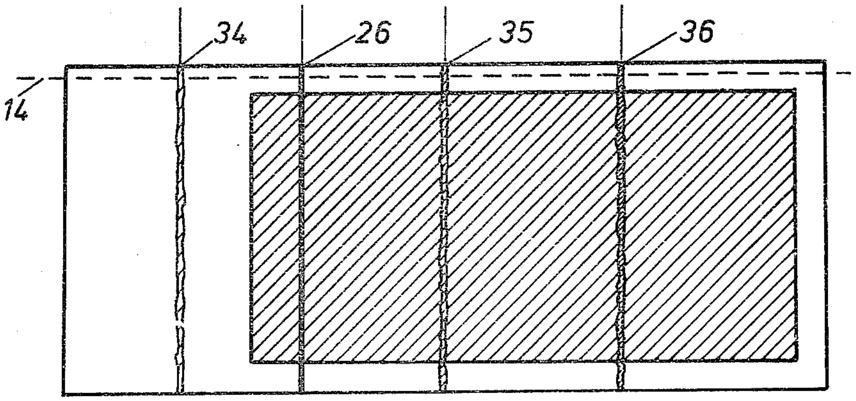
FIG. 4*d* is a schematic representation of a bank-note which is shown to have three strips which are all soiled differently, as well as a safety thread.

For this purpose, the bank-note as shown in FIG. 4d, and for the sake of simplicity, is only shown to have three creases 34, 35, 36 which are all soiled to differently strong extents, as well as the safety thread 26.

The signal waveforms 23, 24, 25, caused by this bank-note passing through the test device, and appearing at the output of the amplifier stage 21, the summation stage 20 and the subtraction stage 22 are plotted in the order of sequence in a rather simplified manner in FIGS. 4a, 4b and 4c, on diagrams of the voltage U over the time t. In the signal waveforms 23, 24, 25 it is possible to clearly recognize the signal variations 34a, 35a, 36a which are due to the degree of soiling at the creases and, therefore, have different amplitudes. The safety thread 26 completely darkens one photodiode and, therefore, causes a correspondingly strong signal variation 26a as is particularly evident from FIG. 4c.

As already mentioned, a further possibility of measuring the degree of dirt accumulation on the bank-note edging, is seen in the use of only one photodiode 10b as shown in FIG. 5. In so doing, the same measuring signal is applied through a delay line 28 and a resistor 29a to one input terminal of a subtraction stage 29. The same measuring signal is also applied by way of a direct line 28a and a resistor 29b to a second input terminal of the subtraction stage. The output of the subtraction stage 29 corresponds to the signal shown in FIG. 4c.

This circuit offers the advantage over the circuit shown in FIG. 3 of using only one photodiode so that the sensor unit can be accommodated within the smallest space. On the other hand, owing to the use of a time delay stage, this circuit involves a considerably higher investment than the circuit as shown in FIG. 3.

Accordingly, both of the briefly explained circuit arrangements provide a signal merely taking into consideration the partial contrasts at the bank-note edging. In both cases the average shading components of the paper or the opacities as differing from bank-note to bank-note are not evaluated by subtraction of the photocell signals.

Figure 6:
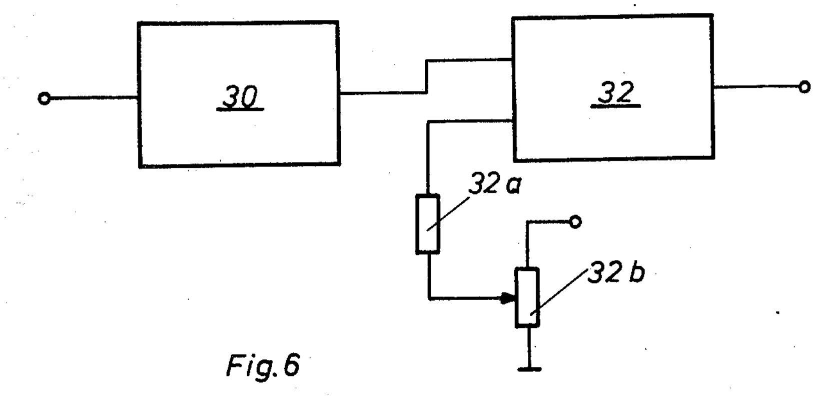
FIG. 6 shows a circuit arrangement for evaluating the photodiode signals.

The signal waveform 25 as appearing in both circuit arrangements at the output of the subtraction stage 22 or 29 and which, in a diagram of the voltage U plotted over the time t in the representation of FIG. 7a, unlike the simple signal waveform shown in FIG. 4c, represents the real conditions existing at a soiled bank-note edging, is now applied to the evaluating unit as shown in FIG. 6 which finally decides on whether the bank-note is suitable for being used.

The evaluating unit consists of an integrator 30 to which the signal waveform 25 as shown in FIG. 7a, is fed, and of a comparator 32 which is aimed at comparing the summed-up output signal of the integrator 30 which is dependent upon the intensity and the number of dirt or soiled regions in the creases, after the bank-note has passed through the test device, with a threshold value which is capable of being adjusted via the resistors 32a, 32b.

Moreover, the integrator 30 which is not specified in greater detail in FIG. 6, is designed as a time-independent integrator, merely aimed at evaluating the pulse edges of the signal waveform 25 to be analyzed. In the course of this, the signal components of one polarity only—in FIG. 7a the negative signal values—are used via a capacitive coupling to an operational amplifier, for charging to a more or less strong extent, quite depending on the respective value, a capacitor arranged in the feedback path of an amplifier. From this there will result the staircase signal waveform 31 as plotted in FIG. 7b in a diagram of the voltage U over the time base t. From this there is particularly evident the varying step height which is due to the signal variations 34a, 35a, 36a as known from FIG. 4c. If now the rising staircase signal waveform 31 remains below an adjusted or predetermined threshold value level of the comparator 32, The tested bank-note has been evaluated as being suitable for use and, conseqently, suitable for remaining in circulation. In the other case, caused by an excessive number of heavily soiled creases, the threshold value is exceeded and the bank-note is evaluated as being unsuitable for use.

Figure 7B:
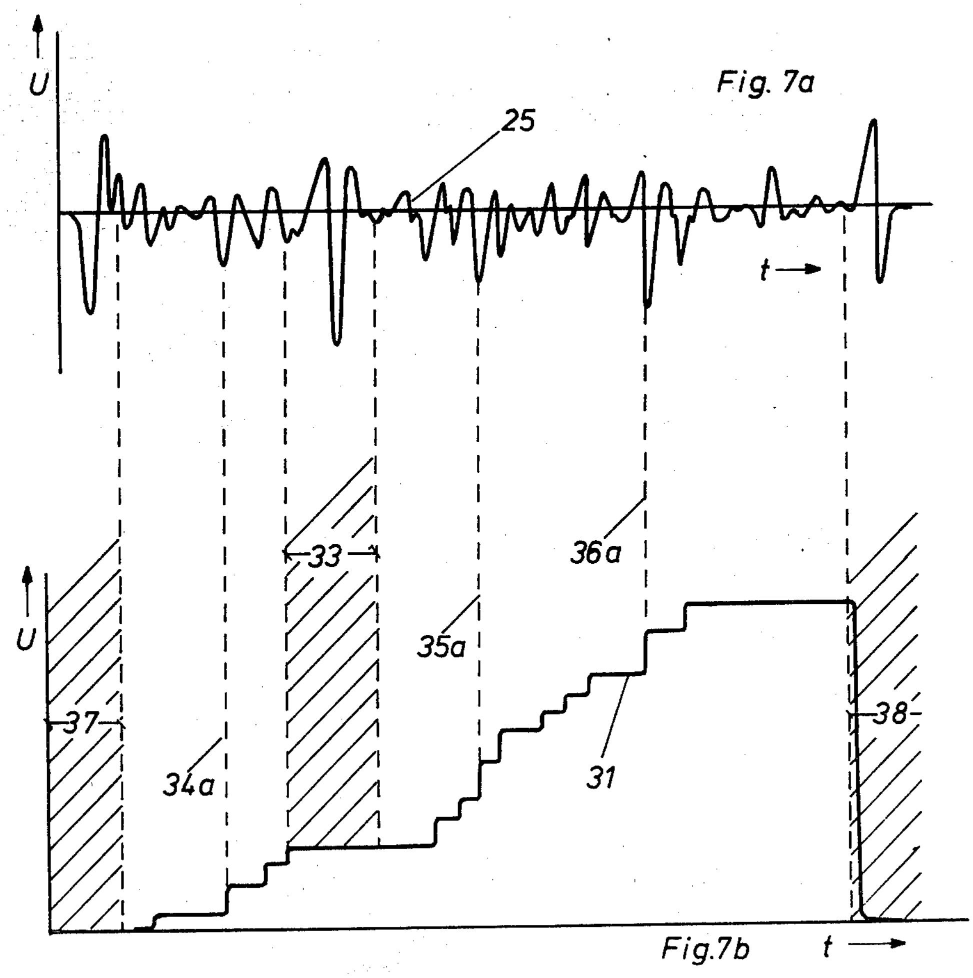

During every passage of a band-note, the influence of various given or exactly defined units of area upon the measuring result may be eliminated by keeping the signal waveform 25, away from the integrator 30. Thus, for example, as indicated in FIG. 7b by the shaded areas, the area 33 around the safety thread 26 well as the relatively strong signal variations indicated by the shaded areas 37, 38 are blanked-out when the bank-note passes into or out of the test device. In the blanked-out areas the voltage is kept at the value reached at the beginning of the respective area.

With the aid of the testing procedure and the associated test device as described in detail hereinbefore, one track on the bank-note edging is evaluated for the purpose of measuring the contrast. On principle, as already mentioned, by correspondingly displacing the test device, the track may also be placed in the central portion of the bank-note, most of which is printed, with care having to be taken that in this case the contrast of the bank-note and, consequently, the output signal of the integrator will decrease as the degree of soiling or dirt accumulation decreases, so that unlike in the case where the bank-note is measured at its edging, the criterium of whether or not a bank-note is suitable for being used or unsuitable for participating in the circulation, will be met whenever the output signal of the integrator falls short of a predetermined threshold value.

The advantage of measuring the contrast in the centre of the bank-note is to be seen in that with respect to the track guidance, larger deviations or tolerances may be admitted than at the bank-note edging. When measuring the contrast in the centre portion of the bank-note it is noticed as a disadvantage, however, that the comparison level required for the evaluation, and owing to the various or differing print patterns, is dependent upon the type of bank-note, so that specific threshold values will be required for all types of bank-notes which, however,—once set as fixed values—are relatively easy to realize. Measuring the contrast at the bank-note edging, however, is independent of the type of bank-note.

Figure 2A:
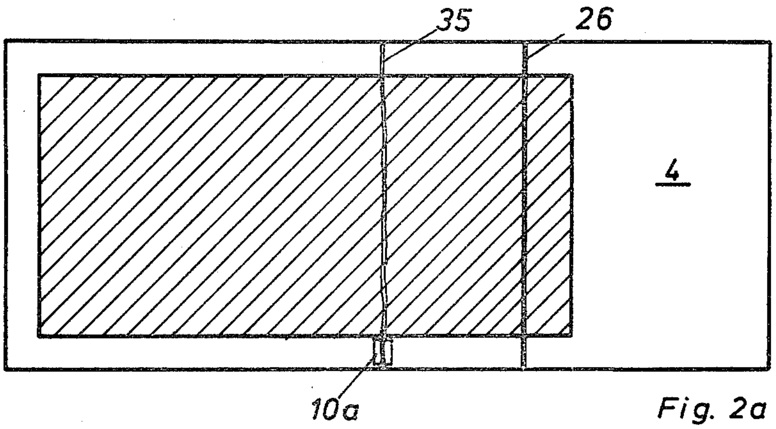
FIGS. 2*a*, 2*b*, 2*c* show the scanning of a bank-note with the aid of a single, dual or triple arrangement of the photodiodes.
Figure 2B:
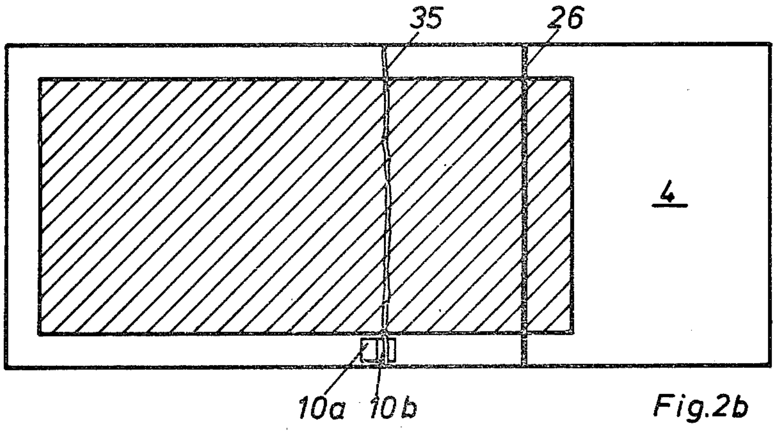
Figure 2C:
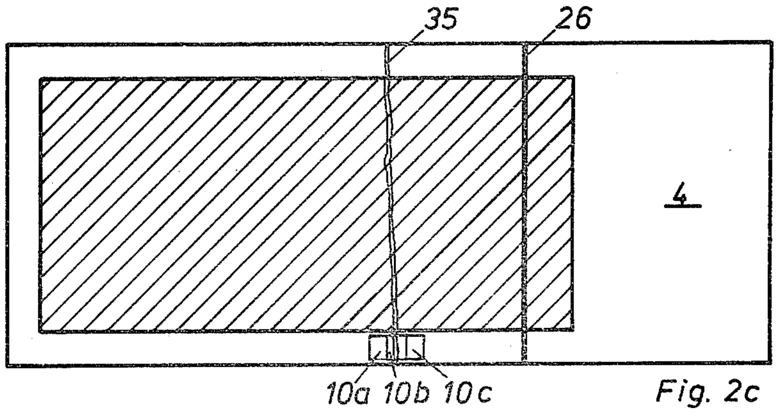

In the examples of embodiment of the testing procedure as described hereinbefore, the sensor unit 10 was once said to be constituted by an arrangement of three photodiodes 10a, 10b, 10c, while another time it was said to be constituted by one single photodiode 10b only. On principle, of course, the sensor units may also have still other diode combinations. Therefore, apart from arrangements employing several photodiodes arranged next to each other, it is also possible, for example, to realize the sensor unit 10 (FIG. 2b) with the aid of two photodiodes 10a, 10b arranged next to each other. This combination offers the advantage over the use of only one photodiode 10*b* in the sensor unit 10, that a time delay circuit may be omitted. The single, dual and triple arrangement of the photodiodes is again shown in FIGS. 2*a*, 2*b* and 2*c*.

Finally, it should still be mentioned that the proper performance of the circuit of the test device is continuously checked by the aforementioned light-emitting diode 11 which is arranged on one side of the sensor unit 10 (FIG. 1). This light-emitting diode each time produces short flashes in the intervals between the testing of two bank-notes. Whenever the photodiode signal has reached a certain threshold value after having passed through the entire circuit arrangement, one can be sure that the device is also ready to functionally cope with the passage of the next successive bank-note.

What is claimed is:

1. A testing device for dynamically testing a bank-note, said device comprising:

- means to provide illumination for for an elemental area of a bank-note;
- means to provide relative movement between said bank-note and the illumination to cause the illumination to scan a narrow track across said bank-note to modify the intensity of the illumination as a function of darkness of elemental areas scanned;
- transducer means to receive the modified light and to produce electrical signals corresponding to the intensity of the modified light;
- comparison means connected to said transducer means to compare a first one of said signals produced when a first said elemental area is illuminated with a second one of said signals produced when a second said elemental area adjacent said first elemental area is illuminated and to produce a comparison signal that has a value based on successive ones of said comparisons;
- integrating means connected to said comparison means to produce an integrated signal based on changes in value of said comparison signal as the illumination scans along the track; and
- indicating means connected to said integrating means to indicate whether or not the integrated signal has exceeded a predetermined value as the illumination scans between two predetermined points along the track.

2. The device as claimed in claim 1 in which said transducer means is located relative to said illumination means and said bank-note to receive light that passes through said bank-note.

3. The device as claimed in claim 1 in which said transducer means is positioned relative to said illumination means and said bank-note to receive light reflected by said bank-note.

4. The device as claimed in claim 1 comprising means to produce a comparison voltage having a predetermined value, said indicating means being connected to said means for producing a comparison voltage to compare the output voltage of said integrating means with said comparison voltage.

5. The device as claimed in claim 1 in which said integrating means produces an output signal that is independent of time and changes in accumulated value only in response to changes of said comparison signal of one polarity.

6. The device as claimed in claim 1 in which said means to provide illumination comprises means to focus light on elemental areas along an unprinted edge region of said bank-note.

7. The device as claimed in claim 1 comprising circuit means to prevent said integrating signal from including changes due to printed information on said bank-note.

8. The device as claimed in claim 1 in which said illumination means illuminates a series of elemental areas across a central region of said bank-note to close said narrow track to pass across printed regions of the bank-note.

9. The device as claimed in claim 1 in which said transducer means comprises first, second, and third photodiodes arranged in that order in a row substantially parallel to said narrow track.

10. The device as claimed in claim 9 in which said comparison means comprises switching circuits connected to said three photodiodes to form a sum signal equal to the sum of the output signals of said first and third diodes and a difference between said sum signal and twice the amplitude of the output signal of said second photodiode, said switching circuits being connected to said integrating means to apply said difference signal to said integrating means.

11. The device as claimed in claim 10 in which said switching circuits comprise an amplifier having an input connected to the output of said second photodiode, a summation circuit having first and second inputs connected to the outputs of said first and third photodiodes, respectively, and a subtraction circuit having a first input connected to the output of said summation circuit and a second input connected to the output of said amplifier.

12. The device as claimed in claim 1 in which said transducer means comprises a single photodiode.

13. The device as claimed in claim 12 comprising, in addition:

- a subtraction circuit having first and second input and having an output connected to said integrating means to supply signals thereto to be integrated thereby;
- a time delay circuit connecting the output of said photodiode to a first one of said inputs of said subtraction circuit; and
- a direct connection from said output of said photodiode to the other of said iputs of said subtraction circuit.

14. The device as claimed in claim 1 in which said transducer means comprises first and second photodiodes arranged next to each other in that order in the direction of movement of the illumination scanning across said bank-note.

15. The device as claimed in claim 14 comprising, in addition, a subtraction circuit having first and second inputs and having an output connected to the input of said indicating means to supply to said integrating means a different signal to be integrated by said integrating means, said first and second inputs of said subtraction circuit being connected, respectively, to the outputs of said first and second photodiodes.

16. The device as claimed in claim 1 in which said means to provide illumination for an elemental area of said bank-note illuminates an unprinted area along the edge of said bank-note and said means to provide relative movement causes the illumination to scan a narrow track along said unprinted edge, said device further comprises circuit means to delete portions of signals produced by said transducer means, whereby said portions are not integrated in said integrating means.

17. The device as claimed in claim 1 comprising, in addition, a testing light source near said transducer means to provide light to actuate said transducer means following each completion of testing of a bank-note.

18. The device as claimed in claim 1 comprising means to hold said bank-note substantially planar, said means to provide illumination comprises means to direct a beam of light at an angle to plane of said bank-note, and said transducer means comprises means to receive light along a limited path from said bank-note and at an angle to the plane of said bank-note, said path and said beam intersecting each other at an obtuse angle in the plane of said bank note.

19. The device as claimed in claim 18 comprising light absorbing and transmitted means located in the path of said beam to receive said illumination in the absence of said bank-note.

20. The device as claimed in claim 1 comprising, in addition, a closed housing having a pair of aligned, narrow slots through which said bank-note is inserted to and discharged from said device.

* * * * *